United States Patent
Kline et al.

(10) Patent No.: US 10,518,904 B2
(45) Date of Patent: Dec. 31, 2019

(54) HANDELING SMART BAGGAGE IN AN AIRPORT

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 27 days.

(21) Appl. No.: 15/992,696

(22) Filed: May 30, 2018

(65) Prior Publication Data

US 2019/0367186 A1 Dec. 5, 2019

(51) Int. Cl.
*B64F 1/36* (2017.01)
*G05B 15/02* (2006.01)
*G06Q 50/14* (2012.01)

(52) U.S. Cl.
CPC .............. *B64F 1/368* (2013.01); *G05B 15/02* (2013.01); *G06Q 50/14* (2013.01)

(58) Field of Classification Search
CPC combination set(s) only.
See application file for complete search history.

(56) References Cited

U.S. PATENT DOCUMENTS

| | | | |
|---|---|---|---|
| 5,225,990 A * | 7/1993 | Bunce | B65G 47/50 700/226 |
| 6,108,636 A | 8/2000 | Yap et al. | |
| 7,015,793 B2 | 3/2006 | Gabig, Jr. et al. | |
| 8,509,945 B1 | 8/2013 | Snaith et al. | |
| 8,676,592 B2 | 3/2014 | Schoen et al. | |
| 2001/0032034 A1* | 10/2001 | Manabe | B64F 1/368 700/225 |
| 2002/0134836 A1* | 9/2002 | Cash | G06Q 10/08 235/385 |
| 2007/0115123 A1 | 5/2007 | Roberts et al. | |
| 2015/0154847 A1 | 6/2015 | Oliver et al. | |
| 2015/0197348 A1* | 7/2015 | Song | B64F 1/366 235/375 |

(Continued)

OTHER PUBLICATIONS

Anonymous, "Automated Baggage Handler", IP.com, IPCOM000020611D, Dec. 12, 2003, 3 pages.

*Primary Examiner* — Kyle O Logan
(74) *Attorney, Agent, or Firm* — Cantor Colburn LLP; Tihon Poltavets

(57) ABSTRACT

Methods, systems and computer program products for controlling a movement of a smart bag through an airport baggage handling system are provided. Aspects include receiving a check-in notification for a passenger traveling with a smart bag, the check-in notification including an identification of the passenger, an identification of the smart bag and an identification of a flight that the passenger is booked on. Aspects also include determining a location of the smart bag in an airport and determining a travel path for the smart bag through the airport from the location to a departure gate for the flight. Aspects further include transmitting instructions to the smart bag based on the travel path, wherein the instructions cause the smart bag to autonomously move along at least a portion of the travel path.

20 Claims, 6 Drawing Sheets

(56) References Cited

U.S. PATENT DOCUMENTS

| | | | |
|---|---|---|---|
| 2016/0042316 A1* | 2/2016 | Gates | G06Q 10/08 |
| | | | 700/230 |
| 2018/0204030 A1* | 7/2018 | Bruce | G06K 7/10366 |
| 2019/0147558 A1* | 5/2019 | Cheikh | B64F 1/366 |
| | | | 361/679.4 |

* cited by examiner

HANDELING SMART BAGGAGE IN AN AIRPORT

BACKGROUND

The invention relates generally to baggage handling and, more specifically, to the handling of smart baggage in an airport.

Smart baggage, that is baggage that is capable of moving on its own, has become more popular and its use by travelers is increasing. Currently, smart bags are available which are configured to follow a traveler as they walk through various environments. For example, the smart baggage will follow the traveler and if any obstacle is found, then the smart baggage will avoid the obstacle and will follow the passenger.

SUMMARY

According to an embodiment, an airport baggage handling system is provided. The system includes a memory having computer readable computer instructions, and a processor for executing the computer readable instructions. The computer readable instructions include instructions for receiving a check-in notification for a passenger traveling with a smart bag, the check-in notification including an identification of the passenger, an identification of the smart bag and an identification of a flight that the passenger is booked on. The computer readable instructions also include instructions for determining a location of the smart bag in an airport and determining a travel path for the smart bag through the airport from the location to a departure gate for the flight. The computer readable instructions further include instructions for transmitting instructions to the smart bag based on the travel path, wherein the instructions cause the smart bag to autonomously move along at least a portion of the travel path.

According to another embodiment, a method for controlling a movement of a smart bag through an airport baggage handling system is provided. The method includes receiving a check-in notification for a passenger traveling with a smart bag, the check-in notification including an identification of the passenger, an identification of the smart bag and an identification of a flight that the passenger is booked on. The method also includes determining a location of the smart bag in an airport and determining a travel path for the smart bag through the airport from the location to a departure gate for the flight. The method further includes transmitting instructions to the smart bag based on the travel path, wherein the instructions cause the smart bag to autonomously move along at least a portion of the travel path.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes receiving a check-in notification for a passenger traveling with a smart bag, the check-in notification including an identification of the passenger, an identification of the smart bag and an identification of a flight that the passenger is booked on. The method also includes determining a location of the smart bag in an airport and determining a travel path for the smart bag through the airport from the location to a departure gate for the flight. The method further includes transmitting instructions to the smart bag based on the travel path, wherein the instructions cause the smart bag to autonomously move along at least a portion of the travel path.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
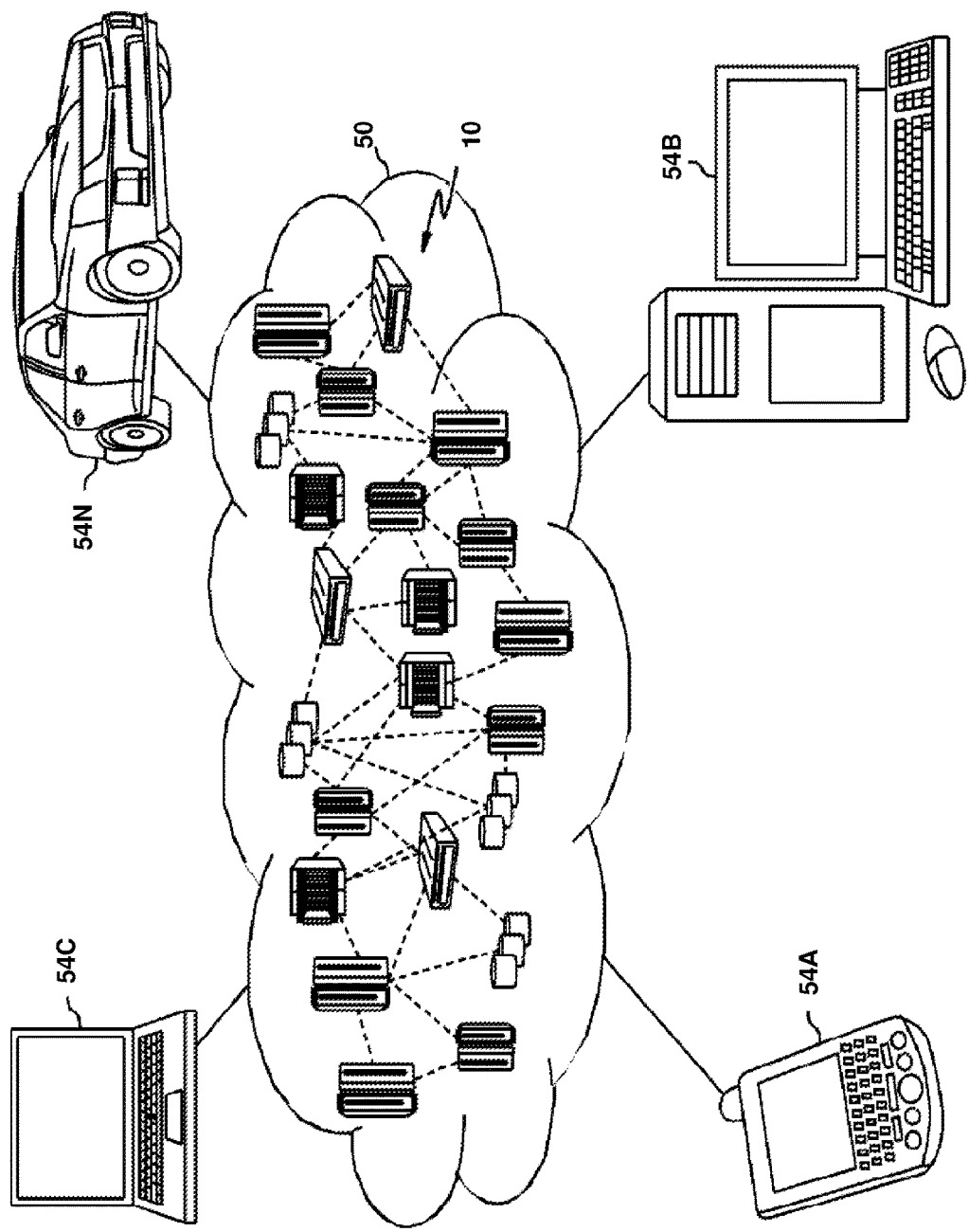
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
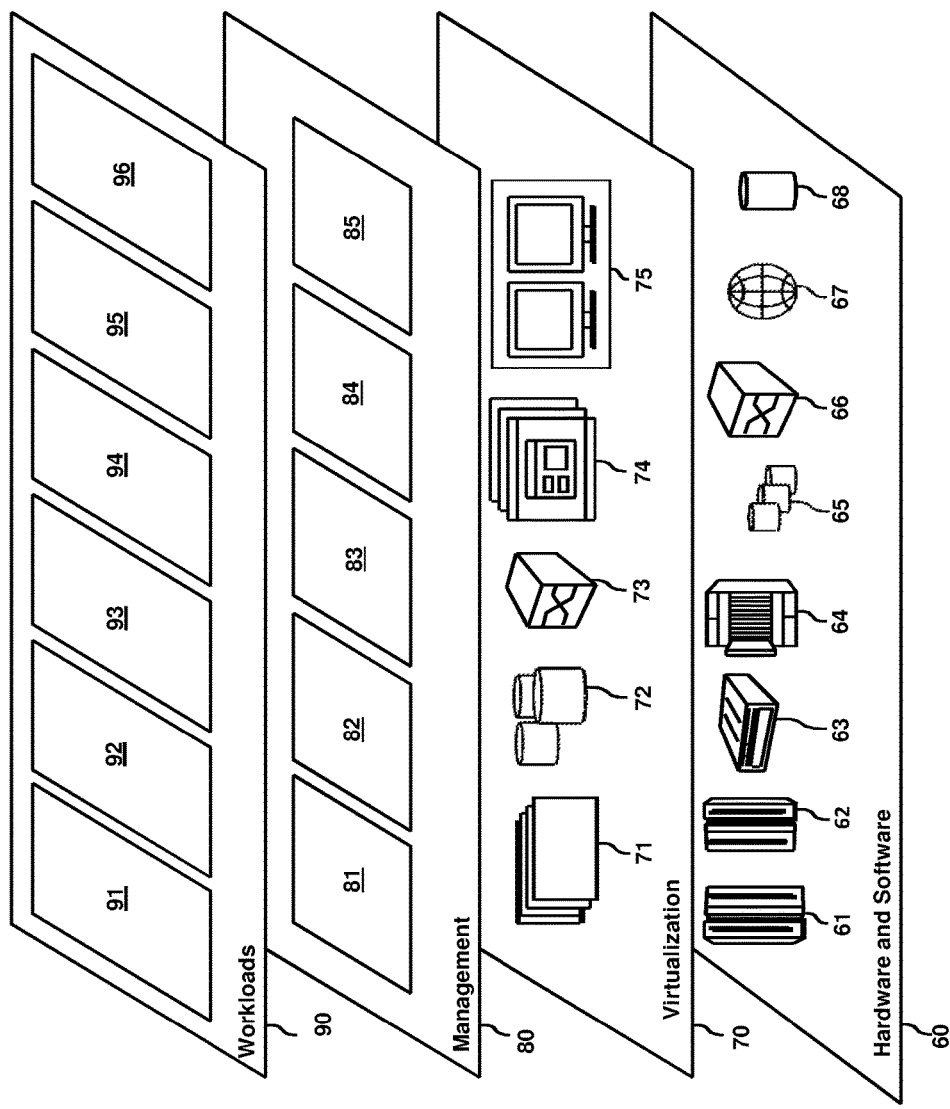
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and handling of smart baggage 96.

Figure 3:
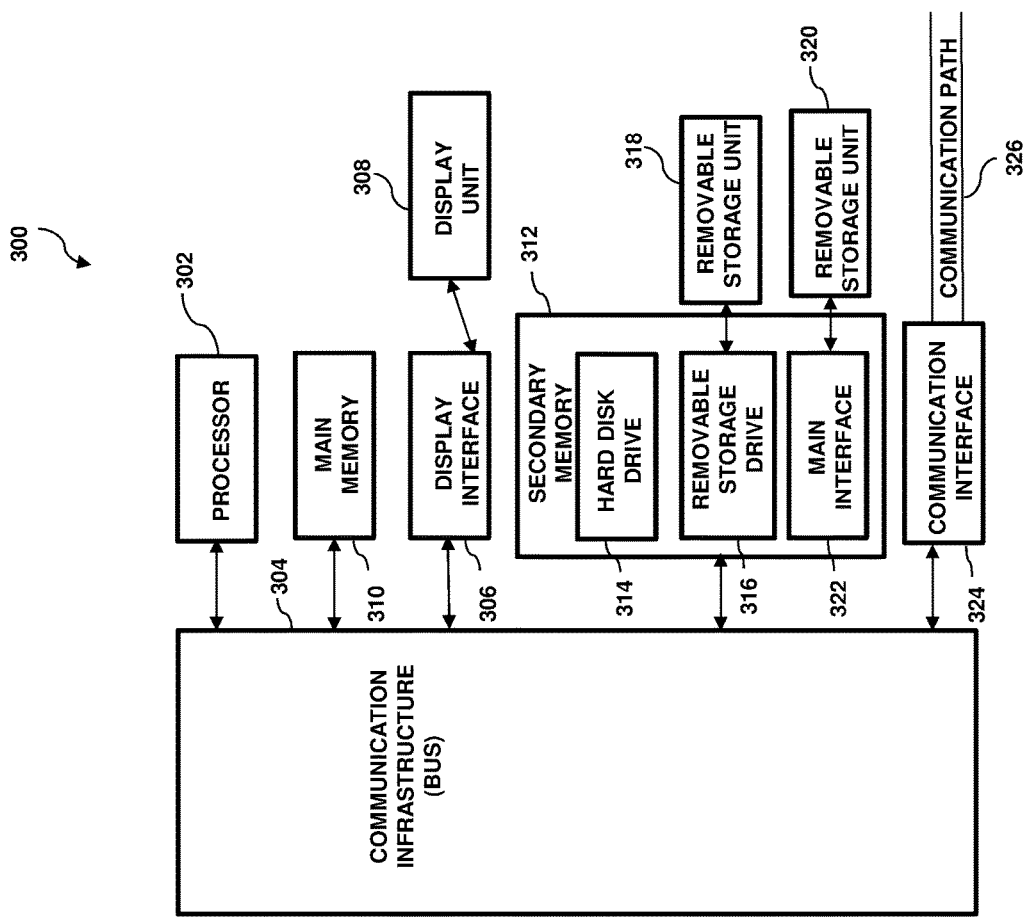
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In exemplary embodiments, method and systems for controlling a movement of a smart bag through an airport baggage handling system are provided. Smart bags are baggage that includes various sensors and motors which are used to autonomously maneuver the baggage through a variety of environments. In exemplary embodiments, after a user checks into the airport with a smart bag, a baggage control system is configured to take control of the movements of the smart bag through a baggage handling system the airport. The baggage handling system can include baggage conveyors, baggage carts, baggage escalators or elevators that can be configured to transport the baggage in addition to using the built in propulsion system of the smart bag.

Figure 4:
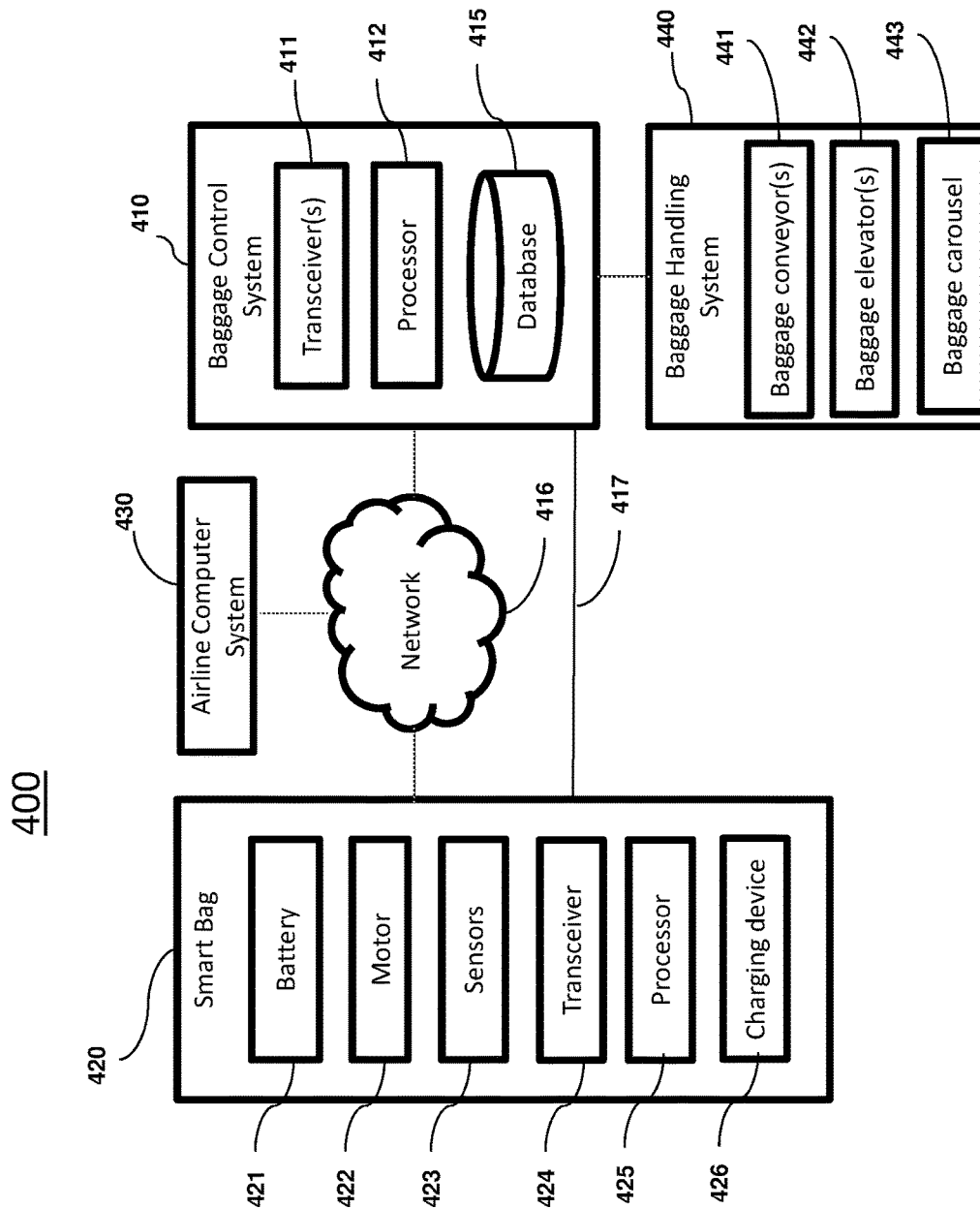
FIG. 4 depicts a system upon which controlling a movement of a smart bag through an airport baggage handling system may be implemented according to one or more embodiments of the present invention.

Turning now to FIG. 4, a system 400 upon which controlling a movement of a smart bag through an airport baggage handling system may be implemented will now be described in accordance with an embodiment. As illustrated the system 400 includes a baggage control system 410, a baggage handling system 440 and a smart bag 420. The baggage control system 410 may be implemented in a computer system, such as the one shown in FIG. 3, or in a cloud based system such as the one shown in FIGS. 1 & 2. As illustrated, the baggage control system 410 can communicate with the smart bag 420, via a direct communications link 417 or via the network 416. In addition, one or both of the smart bag 420 and the baggage control system 410 can be configured to communicate with an airline computer system 430.

In exemplary embodiments, the baggage control system 410 includes one or more transceivers 411 that are configured to communicate with the network 416, the smart bag, 420 and/or the baggage handling system 440. The baggage control system 410 also includes a processor 412 that is configured to control the operation of the baggage handling system 440, including baggage conveyors 441, baggage elevators 442, baggage carousels 443 and the like. Furthermore, the baggage control system 410 includes a database 415 that is configured to store information regarding the smart bags in the baggage handling system 440. In exemplary embodiments, the baggage control system 410 receives passenger and flight data from the airline computer system 430, via the network 416. This information can be stored in the database along with information regarding smart bags 420 that belong to passengers.

In exemplary embodiments, the smart bag 420 includes a battery 421, a motor 422, one or more sensors 423, a transceiver 424, a processor 425 and a charging device 426. In exemplary embodiments, the processor 425 is configured to receive instructions from the baggage control system 410, via the transceiver 424, and to responsively control the operation of the motor 422. In addition, the processor 425, can receive data from the sensors 423 and can responsively control the motor 422 to ensure the smart bag 420 does not collide with any obstacles.

In one embodiment, the charging device 426 is configured to receive power from one of the baggage conveyor 441, the baggage elevator 442 or the baggage carousel 443 while the smart bag 420 is utilizing the baggage conveyor 441, the baggage elevator 442 or the baggage carousel 443. The charging device 426 can be a physical charging device that mechanically couples to the baggage conveyor 441, the baggage elevator 442 or the baggage carousel 443 or it can be an inductive charging device that receives power wirelessly. The charging device 426 is configured to recharge the battery while the smart bag 420 is using the baggage handling system 440.

In exemplary embodiments, the airline computer system 430 is configured to communicate with the baggage control system 410 and can notify the baggage control system 410 when a passenger having a smart bag 420 has boarded an aircraft. Likewise, the airline computer system 430 can generate an alert if an aircraft is ready for departure from a gate and has a smart bag 420 loaded for a passenger that is not onboard of the aircraft.

In one embodiment, a traveler will drop off a smart bag at a check-in counter in an airport, at which point the baggage control system will assume control of the movements of the smart bag. The baggage control system can assume control of the smart bag by exchanging messages, in a handshake manner, with the smart bag. The smart bag will then enter the baggage handling system under the control of the baggage control system. Once check-in is done, the smart bag will not be following the traveler but it will rather move through the baggage handling system, and may be coupled with a baggage elevator or conveyor. The baggage handling system may be configured to cluster baggage based on flight number, timing, destination, and the cluster of bags can be moved through the baggage handling system together, using, for example, a self-moving trolley. The self-moving trolley can be an autonomous baggage cart that has a comparatively higher speed than that of the speed of the smart bags, this will help the baggage handling system to quickly load the aircraft.

In exemplary embodiments, once the baggage is unloaded from an arriving airplane, the smart bags in the baggage are controlled by the baggage control system and are moved through the baggage handling system for the passenger to retrieve at baggage claim. In one embodiment, while handing over the baggage to appropriate passenger, the baggage control system can communicate with a mobile device of the passenger and can validate that the right passenger is picking the baggage. If an individual other than the passenger associated with the smart bag attempts to remove the smart bag from the baggage carousel, an alert will be triggered. Upon validating the smart bag belongs to the passenger, the baggage control system will return the control of the smart bag to the passenger.

Figure 5:
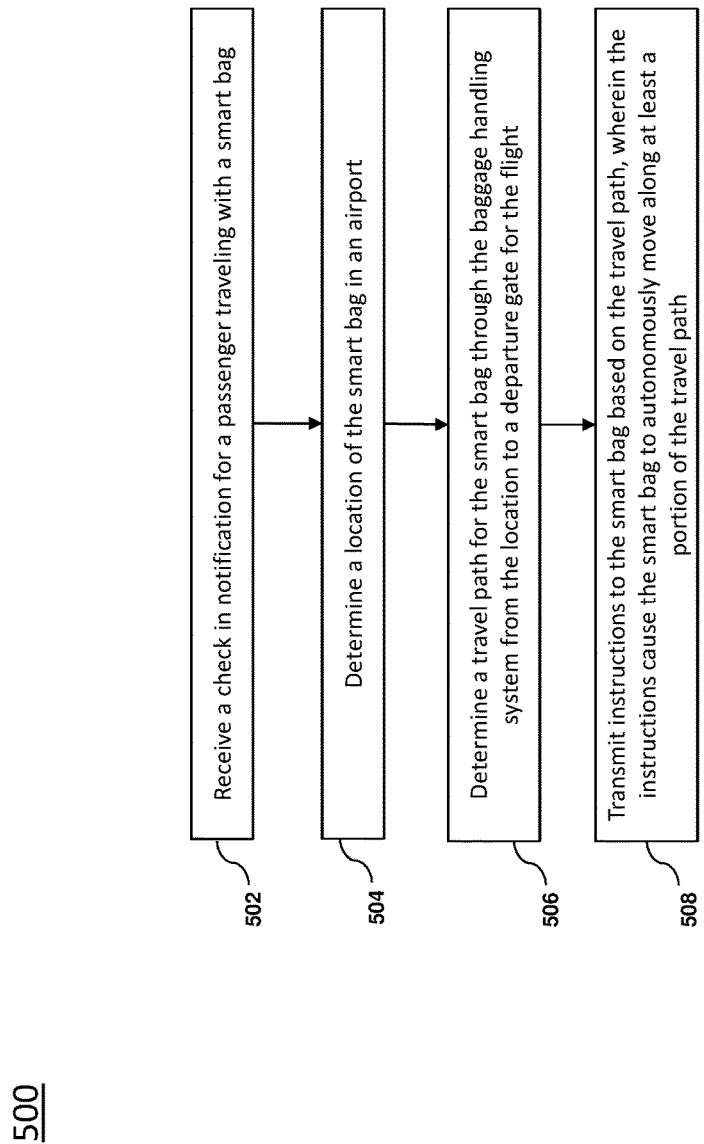
FIG. 5 depicts a flow diagram of a method for controlling a movement of a smart bag through an airport baggage handling system according to one or more embodiments of the present invention.

Turning now to FIG. 5, a flow diagram of a method 500 for controlling a movement of a smart bag through an airport baggage handling system in accordance with an embodiment is shown. The method 500 includes receiving a check-in notification for a passenger traveling with a smart bag, as shown at block 502. In exemplary embodiments, the check-in notification includes an identification of the passenger, an identification of the smart bag and an identification of a flight that the passenger is booked on. Next, as shown at block 504, the method 500 includes determining a location of the smart bag in an airport. In exemplary embodiments, the location can be determined based on where the check-in notification was generated, by triangulating a signal emitted by the smart bag that is received by various sensors, or the like. The method 500 includes determining a travel path for the smart bag through a baggage handling system of the airport from the location to a departure gate the flight, as shown at block 506. Next, as shown at block 508, the method 500 includes transmitting instructions to the smart bag based on the travel path. The instructions cause the smart bag to autonomously move along at least a portion of the travel path. In exemplary embodiments, the travel path can include the smart bag utilizing one or more of a baggage conveyor, a baggage elevator and a baggage cart of the baggage handling system.

In exemplary embodiments, the method can also include receiving an indication that the flight is ready to depart a gate and responsively determining whether the passenger is aboard the flight. Based on a determination that the passenger is not aboard the flight, the baggage control system can transmit instructions to the smart bag to deplane the flight.

Figure 6:
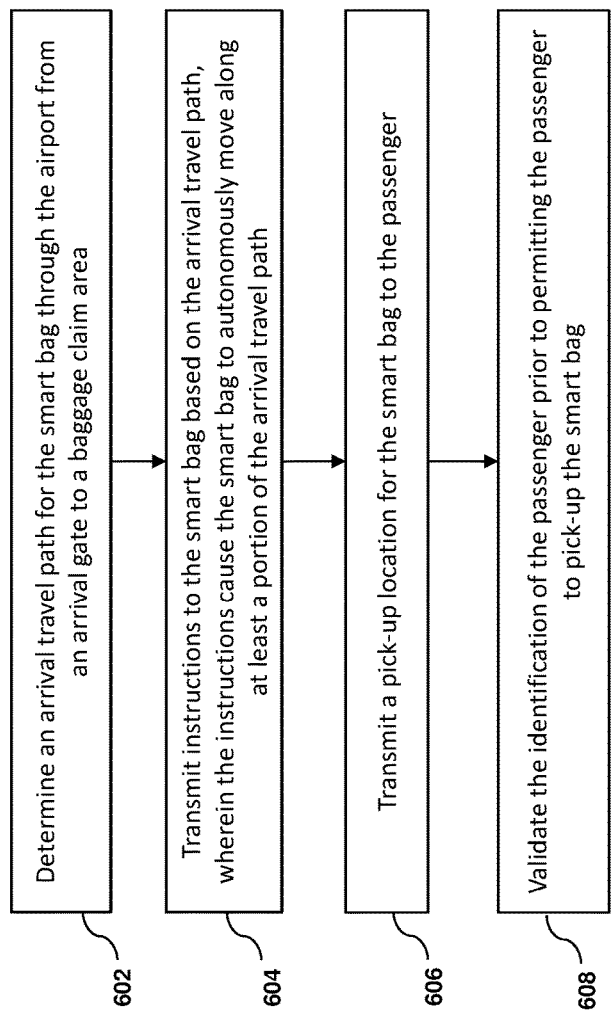
FIG. 6 depicts a flow diagram of a method for controlling a movement of a smart bag through an airport baggage handling system according to one or more embodiments of the present invention.

Turning now to FIG. 6, a flow diagram of a method 600 for controlling a movement of a smart bag through an airport baggage handling system in accordance with an embodiment is shown. As shown at block 602, the method 600 includes determining an arrival travel path for the smart bag through the airport from an arrival gate to a baggage claim area. Next, as shown at block 604, the method 600 includes transmitting instructions to the smart bag based on the arrival travel path. The instructions cause the smart bag to autonomously move along at least a portion of the arrival travel path. In exemplary embodiments, the arrival travel path can include the smart bag utilizing one or more of a baggage conveyor, a baggage elevator and a baggage cart of the baggage handling system. The method 600 also includes transmitting a pick-up location for the smart bag to the passenger, as shown at block 606. In exemplary embodiments, the pick-up location can be sent to the passenger via email, text, or via an application notification. Next, as shown at block 608, the method includes validating the identification of the passenger prior to permitting the passenger to pick-up the smart bag.

In some embodiments, an airport can utilize self-moving luggage carts or trays to handle baggage items that are not smart bags. As a result, the baggage items that not self-moving can be kept in those type of tray, and accordingly the same baggage will become self-moving baggage. In exemplary embodiments, the smart bags also include an auto coupling mechanism, so, that the baggage can couple conveyor system. In this case, the conveyor can be a vertical elevator or any inclined conveyor system. The auto-coupling mechanism will also have a locking mechanism, so when the baggage is coupled with the conveyor, it will move along with the movement direction of the conveyor/elevator. When the baggage needs to be released, then the lock will be released, and then with self-moving capability, the baggage will be detached from the conveyor. Likewise, the above mentioned self-moving luggage carts or trays will also have the similar auto-coupling and locking mechanism, so along with the tray, the baggage present tray will also be locked and moving along with the direction of the conveyor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for controlling movement of smart baggage in an airport, comprising:
   a baggage control system having a memory having computer readable instructions and a processor for executing the computer readable instructions, the computer readable instructions include instructions for:
   receiving a check-in notification for a passenger traveling with a smart bag, the check-in notification including an identification of the passenger, an identification of the smart bag and an identification of a flight that the passenger is booked on;
   determining a location of the smart bag in the airport;
   determining a travel path for the smart bag through the airport from the location to a departure gate for the flight; and
   transmitting instructions to the smart bag based on the travel path, wherein the instructions cause the smart bag to autonomously move along at least a portion of the travel path and cause the smart bag to utilize a baggage handling system of the airport for at least another portion of the travel path.

2. The system of claim 1, wherein the baggage handling system includes one or more of a baggage conveyor, a baggage elevator and a baggage cart.

3. The system of claim 2, wherein the instructions cause the smart bag to utilize one or more of the baggage conveyor, the baggage elevator and the baggage cart.

4. The system of claim 3, wherein the smart bag includes a motor, a processor, a battery and a transceiver.

5. The system of claim 4, wherein the smart bag further includes a charging device that is configured to receive power from one or more of the baggage conveyor, the baggage elevator and the baggage cart and to responsively charge the battery.

6. The system of claim 5, wherein the charging device includes an inductive coupling.

7. The system of claim 1, wherein the computer readable instructions also include instructions for:
   receiving an indication that the flight is ready to depart a gate;
   determining whether the passenger is aboard the flight; and
   based on a determination that the passenger is not aboard the flight, transmitting instructions to the smart bag to deplane the flight.

8. The system of claim 1, wherein the computer readable instructions also include instructions for:
   determining an arrival travel path for the smart bag through the airport from an arrival gate to a baggage claim area; and
   transmitting instructions to the smart bag based on the arrival travel path, wherein the instructions cause the smart bag to autonomously move along at least a portion of the arrival travel path and cause the smart bag to utilize the baggage handling system of the airport for at least another portion of the arrival travel path.

9. The system of claim 8, wherein the computer readable instructions also include instructions for:
   transmitting a pick-up location for the smart bag to the passenger; and
   validating the identification of the passenger prior to permitting the passenger to pick-up the smart bag.

10. A method for controlling a movement of a smart bag through an airport, the method comprising:
    receiving a check-in notification for a passenger traveling with the smart bag, the check-in notification including an identification of the passenger, an identification of the smart bag and an identification of a flight that the passenger is booked on;
    determining a location of the smart bag in the airport;
    determining a travel path for the smart bag through the airport from the location to a departure gate for the flight; and transmitting instructions to the smart bag based on the travel path, wherein the instructions cause the smart bag to autonomously move along at least a portion of the travel path.

11. The method of claim 10, wherein airport includes a baggage handling system having one or more of a baggage conveyor, a baggage elevator and a baggage cart.

12. The method of claim 11, wherein the instructions cause the smart bag to utilize one or more of the baggage conveyor, the baggage elevator and the baggage cart.

13. The method of claim 12, wherein the smart bag includes a motor, a processor, a battery and a transceiver.

14. The method of claim 13, wherein the smart bag further includes a charging device that is configured to receive power from one or more of the baggage conveyor, the baggage elevator and the baggage cart and to responsively charge the battery.

15. The method of claim 14, wherein the charging device includes an inductive coupling.

16. The method of claim 10, wherein the method also includes:
receiving an indication that the flight is ready to depart a gate;
determining whether the passenger is aboard the flight; and
based on a determination that the passenger is not aboard the flight, transmitting instructions to the smart bag to deplane the flight.

17. The method of claim 16, the method also includes:
determining an arrival travel path for the smart bag through the airport from an arrival gate to a baggage claim area; and
transmitting instructions to the smart bag based on the arrival travel path, wherein the instructions cause the smart bag to autonomously move along at least a portion of the arrival travel path.

18. The method of claim 10, wherein the method also includes:
transmitting a pick-up location for the smart bag to the passenger; and
validating the identification of the passenger prior to permitting the passenger to pick-up the smart bag.

19. A computer program product comprising a computer readable storage medium having program instructions embodied therewith the program instructions executable by a computer processor to cause the computer processor to perform a method, comprising:
receiving a check-in notification for a passenger traveling with a smart bag, the check-in notification including an identification of the passenger, an identification of the smart bag and an identification of a flight that the passenger is booked on;
determining a location of the smart bag in an airport;
determining a travel path for the smart bag through the airport from the location to a departure gate for the flight; and
transmitting instructions to the smart bag based on the travel path, wherein the instructions cause the smart bag to autonomously move along at least a portion of the travel path.

20. The computer program product of claim 19, wherein the method further comprises:
receiving an indication that the flight is ready to depart a gate;
determining whether the passenger is aboard the flight; and
based on a determination that the passenger is not aboard the flight, transmitting instructions to the smart bag to deplane the flight.

* * * * *